Patented June 14, 1927.

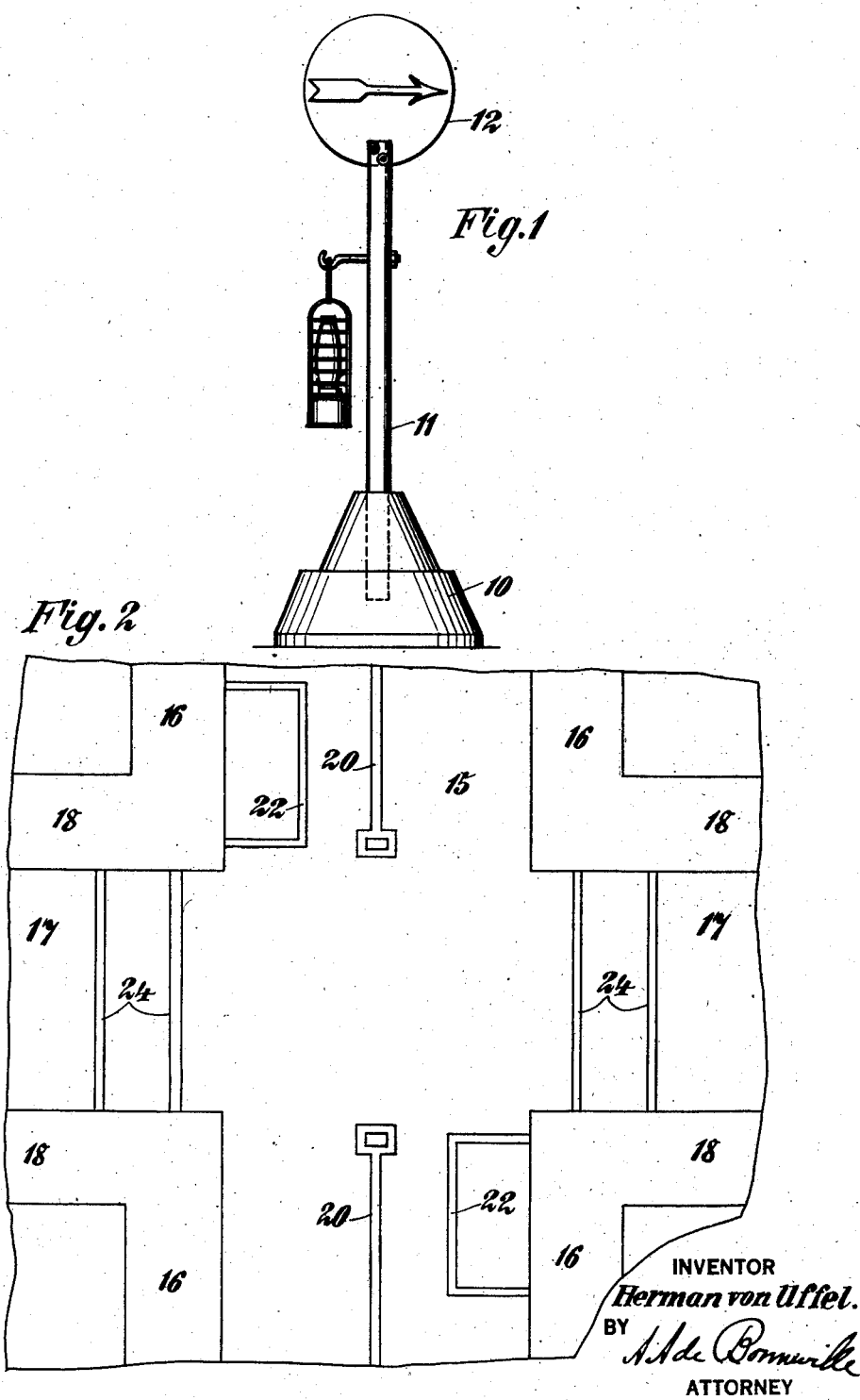

1,632,766

UNITED STATES PATENT OFFICE.

HERMAN VON UFFEL, OF PHILADELPHIA, PENNSYLVANIA.

LUMINOUS PHOSPHORESCENT AND WATERPROOF COMPOSITION.

Application filed August 2, 1924. Serial No. 729,765.

This invention relates to a luminous phosphorescent, and waterproof composition.

The object of the invention is the production of a luminous phosphorescent composition which is adapted to mark surfaces, side walks, thoroughfares and traffic guides for the guidance of pedestrians and vehicles either during the day or night. The second object of the invention is the production of a marking composition, which is water and weather proof, adhesive, luminous and adapted to be used for safety zone street crossing guides. The third object of the invention is the production of a composition, which is always luminous at night and bright and brilliant in the daylight. The fourth object of the invention is the production of a composition which will emit a phosphorescent glow and which can, by varying its ingredients produce either of the following colors in varying degrees, that is to say; luminous blue, luminous violet, luminous blue green, luminous white green, or luminous white grey.

To produce the luminous blue green phosphorescent glow the following ingredients are compounded in about the proportions by weight as follows:—calcium sulfide 1, calcium oxide 1, potassium sulphate 1, thallium nitrate 2, sulphur 4, lithium carbonate 1, rubidium nitrate 1, barium hydroxide 1, silicate of soda 6, China wood oil 6.

The solid substances of the composition are pulverized and then mixed to produce the color and intensity thereof desired. The mixture is then subjected to various degrees of heat from cherry red to white heat. The luminous color produced is varied by the heat imparted. The mixed calcined mass which is light absorbent when exposed to the bright light of the sun, to daylight, or to artificial light, is then mixed with the China wood oil of the composition. The composition diffuses the light absorbed in a luminous glow, which is protected from wear and weather by the mixture of the silicate of soda and the China wood oil. The combined composition will absorb light and reflect the light glow at night or in the dark.

In the accompanying drawings, Fig. 1 shows an elevation of a safety zone street crossing guide, which comprises the base 10, the vertical post 11 and the disc 12. The compound is applied to the base 10 and the disc 12.

Fig. 2 shows a plan view of a street crossing in which the main roadway is indicated at 15 with the side walks 16, the cross roadway at 17 with the side walks 18. The composition is used to mark the traffic lines 20, the jitney-bus zones 22, and the traffic guides 24 for foot passengers.

The calcium sulphide, calcium oxide, potassium sulphate and thallium nitrate, together when a composition of them is made, produce a luminous phosphorescent body for the composition. The sulphur is a phosphorescent element of the composition. The lithium carbonate, rubidium nitrate and barium hydro-oxide when mixed constitute a luminous and phosphorescent agent. The silicate of soda constitutes a binder and the China wood oil serves the purpose of a transparent, water proof adhesive binding agent for the composition.

Various modifications may be made in the composition and the specific mixtures described in this application are to be taken as illustrative and not limitative thereof.

Having described my invention what I desire to secure by Letters Patent and claim is:—

A luminous composition of the character described comprising calcium sulfide, calcium oxide, potassium sulphate, thallium nitrate, sulphur, lithium carbonate, rubidium nitrate, barium hydroxide, silicate of soda and China wood oil.

Signed at the borough of Manhattan, city of New York, in the county of New York and State of New York, this 23d day of July, A. D. 1924.

HERMAN VON UFFEL.